United States Patent [19]

Low

[11] 4,397,736

[45] Aug. 9, 1983

[54] HYDROTREATING SUPERCRITICAL SOLVENT EXTRACTS IN THE PRESENCE OF ALKANE EXTRACTANTS

[75] Inventor: Jim Y. Low, Bartlesville, Okla.

[73] Assignee: Phillips Petroleum Company, Bartlesville, Okla.

[21] Appl. No.: 249,804

[22] Filed: Apr. 1, 1981

[51] Int. Cl.$^3$ .................... C10G 1/04; C10G 21/14
[52] U.S. Cl. .................... 208/11 LE; 208/213; 208/211; 208/238; 208/254 H; 208/323
[58] Field of Search .................... 208/11 LE, 87, 142, 208/323, 211, 213, 238, 254 H

[56] References Cited

U.S. PATENT DOCUMENTS

| T861,027 | 4/1969 | Long et al. | 208/11 R |
|---|---|---|---|
| 2,118,940 | 5/1938 | Pier et al. | 208/10 |
| 2,270,674 | 1/1942 | Pilat et al. | 208/323 |
| 2,793,104 | 5/1957 | Rees | 48/197 |
| 3,421,868 | 1/1969 | Feldmann | 48/197 |
| 3,594,305 | 7/1971 | Kirk, Jr. | 208/10 |
| 3,607,717 | 9/1971 | Roach | 208/8 LE |
| 3,813,329 | 5/1974 | Gatsis | 208/9 |
| 3,929,193 | 12/1975 | Duke | 208/11 LE |
| 3,970,541 | 7/1976 | Williams et al. | 208/8 |
| 3,997,424 | 12/1976 | Urquhart | 208/8 |
| 4,019,975 | 4/1977 | Urquhart | 208/10 |
| 4,083,769 | 4/1978 | Hildebrand et al. | 208/10 |
| 4,108,760 | 8/1978 | Williams et al. | 208/11 LE |
| 4,155,832 | 5/1979 | Cox et al. | 208/10 |
| 4,158,638 | 6/1979 | Tsai | 208/11 LE |
| 4,197,183 | 4/1980 | Audeh | 208/11 LE |
| 4,297,200 | 10/1981 | Briley | 208/10 |
| 4,303,495 | 12/1981 | Behrmann et al. | 208/8 LE |

FOREIGN PATENT DOCUMENTS 493307 10/1938 United Kingdom .......... 208/11 LE

OTHER PUBLICATIONS

"Supercritical Gas Extraction Commercial," from Process Engineering, (Aug., 1977), p. 6.

*Primary Examiner*—Delbert E. Gantz
*Assistant Examiner*—O. Chaudhuri

[57] ABSTRACT

A process of recovering the hydrocarbon values from low organic carbon content deposits comprises the hydrotreating of hydrocarbons from those deposits in the presence of supercritical alkane-containing solv

5 Claims, No Drawings

HYDROTREATING SUPERCRITICAL SOLVENT EXTRACTS IN THE PRESENCE OF ALKANE EXTRACTANTS

BACKGROUND

Carbonaceous materials of low organic carbon content, such as tar sands and oil shale, are showing promise as a source of hydrocarbons.

Deposits of oil shales and tar sands have been discovered in regions of North America as well as in other parts of the world. These discoveries have sparked new scientific and commercial interest in practical methods for separating hydrocarbons from these deposits used for fuels.

OBJECT OF THE INVENTION

It is one object of the invention to provide a process for hydrotreating a low organic carbon content material in the presence of a supercritical solvent.

It is another object of the invention to extract the hydrocarbons from a low organic carbon content deposit and to hydrotreat the extract.

It is still another object of this invention to provide a method for hydrotreating tar sand or oil shale in the presence of an alkane solvent under supercritical conditions.

THE INVENTION

According to one aspect of the invention, oil shale, in any suitable physical form, is hydrogenated to produce a stock oil.

In accordance with another aspect of this invention, oil shale is subjected to supercritical solvent extraction with an alkane-containing solvent. During or after the extraction that hydrocarbon-containing fluid is hydrogenated to produce a stock oil having low nitrogen content and a high H/C ratio.

In accordance with still another aspect of this invention, oil shale is supercritically extracted with a mixture of solvents; and, during or after the extraction, the fluid is hydrogenated.

THE LOW ORGANIC CARBON CONTENT MATERIALS

By "low organic carbon content materials" is meant carbonaceous materials in which organically bound carbon constitutes about 25 weight percent or less of the material. Suitable materials include oil shale, tar sands, oil sands, and similar deposits. Coal, lignite, and other materials which contain more than 25 weight percent organically bound carbon are not included in the invention.

Some of the largest known deposits of suitable materials are shale, tar sands, oil sands, and similar deposits. Coal, lignite, and other materials which contain more than 25 weight percent organically bound carbon are not included in the invention.

Some of the largest known deposits of suitable materials are found in the Athabasca region of Alberta, Canada, and in the Western, Mid-Western, and Eastern United States. The invention is particularly effective for treating Eastern oil shales, such as Kentucky shales.

THE SUPERCRITICAL SOLVENT EXTRACTION STEP

The critical temperature for a substance is the temperature above which it cannot be liquified by an increase in pressure. Critical temperature, then, depends upon the identity of the solvent used. The supercritical extraction temperature will generally lie between the critical temperature of the solvent and 100° C. above its critical temperature. Useful extraction temperatures will generally be from about 100° C. to 600° C., with about 250° to 275° C. preferred.

The pressure at which the supercritical extraction takes place depends upon the identity of the solvent employed. The pressures used during the extraction step of the invention will range from the critical pressure of the solvent to 15,000 psi or higher. Preferred pressures lie between about 750 psi and 3,000 psi.

The liquid hourly space velocity (LHSV) employed will usually range from about 0.5 to 5. An LHSV of about 1 to 2 is preferred. Note that the space velocity can be denoted in units v/v/hr or $v_f/v_c/hr$ wherein $v_f$ is the volume of fluid, $v_c$ is the volume of catalyst, and hr is hours.

The solvents used as extractants and hydrotreating media in this invention are generally alkanes, i.e., paraffins. The alkanes contain between 2 and 20 carbon atoms and are aliphatic, branched, or cyclic. Alkanes having 4 to 8 carbons are preferred. N-heptane is most preferred. Mixtures of alkanes can be used. Alternatively, the hydrotreating medium can comprise a mixture of alkanes and aromatic compounds. Suitable aromatic compounds are benzene, toluene, xylene, naphthalene, or substituted forms thereof. Various operable solvents and critical parameters therefor are given below:

| Solvent | Critical Temperature (°C.) | Critical Pressure (psi) |
|---|---|---|
| n-pentane | 196.5 | 489 |
| n-hexane | 234 | 437 |
| n-heptane | 267 | 397 |
| n-octane | 296 | 361 |
| n-nonane | 321 | 335 |
| n-decane | 344 | 305 |
| cyclohexane | 280 | 591 |
| methylcyclohexane | 298 | 504 |

In a preferred embodiment, a mixture of one or more aromatic solvents and one or more structurally related paraffins, i.e., cycloaliphatic solvents is employed. The term "structurally related paraffins" refers to saturated compounds whose configurations are analogous to one or more of the aromatic solvents used. Suitable mixtures contain benzene or its substituted derivatives in combination with cyclohexane or its substituted derivatives. Useful cosolvent combinations include benzene and cyclohexane; toluene and methylcyclohexane; and xylenes and dimethylcyclohexanes. A mixture comprising toluene and methylcyclohexane is preferred.

When combinations of aromatic and structurally related paraffin solvents are employed, the concentration of paraffin solvent therein will range from 2 to 10 weight percent, with 5 to 10 weight percent preferred. Reclaimed solvents boiling at temperatures under 150° C. are also operable.

No provision need be made for the removal of extractant or solvent before the hydrogenation step. The extractant remains in the system during hydrogenation. Preferably, little or no condensation takes place before hydrogenation.

Applicant has discovered that alkane-containing solvents are superior media for hydrotreating his carbonaceous materials. The products have higher H/C ratios and lower nitrogen contents than those produced using aromatic media such as toluene. The use of alkane solvents in both the extraction and hydrogenation steps is clearly advantageous in view of the production of lighter product with lower hydrogen consumption.

THE HYDROGENATION STEP

The hydrogenation or hydrotreating operation is carried out by contacting the material to be treated with hydrogen, preferably in the presence of at least one catalyst. The hydrogen can be introduced along with the extracting fluids, during the extraction step, or between the extraction and hydrogenation steps.

The hydrogenation will preferably take place in the presence of the supercritical extractant. The crude oil shale may be hydrogenated prior to solvent extraction but a large coke deposit formed thereby on the hydrogenation catalyst makes such hydrogenation impractical.

Useful catalysts for the hydrogenation operation include Groups VIb, VII, and VIII metals, their oxides and salts. Suitable metals are tungsten, cobalt, molybdenum, nickel, iron, platinum, and palladium. Combinations of two or more metals may also be used. A nickel-molybdenum combination, such as Nalco Ni-Mo catalyst is preferred.

The catalyst employed may be on a suitable carrier during use. Useful carriers include alumina, silica, silica-alumina, metal oxides, and mixtures of metal oxides.

The catalyst and support may be sulfided or unsulfided.

The hydrogenation step takes place under controlled conditions of temperature, pressure, and hydrogen rate. The temperature used is generally from 200° to 475° C. with 250°-425° C. preferred. The pressure used will vary from 750 to 10,000 psig and will preferably be about 1,000-3,000 psig. The hydrogen rate used is between 100 and 10,000 scf/bbl., preferably 500-2,500 scf/bbl of fluid treated.

The hydrogenation step produces a mixture of alkanes having less than 0.05% sulfur and less than 0.3% nitrogen. When solvent extracted oil shale is hydrogenated in accordance with the invention, the resultant product will typically contain 0.01% or less of sulfur and 0.02% or less of nitrogen.

In combination with the hydrogenation step, other conventional operations, such as desulfurization or retorting, may be employed.

The solids and fluids produced can be separated by conventional methods. Useful devices include cyclones, filters, settling devices, or combinations thereof.

The fractions within the fluid phase can be separated via one or more conventional cooling, pressure reduction, or distillation steps. Combined methods are also operable.

EXAMPLES

EXAMPLE I

Paraho shale oil blended with four times its weight of solvent under supercritical solvent conditions of 850° F., 1400 psig and 1.6 $v_{cf}/v_f$/hr was hydrotreated over Nalco Ni-Mo catalyst with the following results:

| Solvent | Estimated $H_2$ Consumption, scf/bbl | Heavy Oil Fraction* | | | |
|---|---|---|---|---|---|
| | | Wt. % of Feed | Nitrogen, ppm. | Sulfur, Wt. % | H/C Ratio |
| Toluene | 2600 | 47 | 3149 | .01 | 1.66 |
| N-Heptane | 1200 | 36 | 1595 | .01 | 1.79 |
| N-Heptane | 1200 | 37 | 1990 | .01 | 1.82 |

*Oil boiling above 310° F.

This example shows the surprising and beneficial results favoring carrying out the process with paraffinic solvent including: (1) lower hydrogen consumption, (2) reduced heavy oil in the product (higher conversion) and (3) better heavy oil properties (lower nitrogen, higher H/C ratio).

EXAMPLE II

Paraho shale oil was hydrotreated over Nalco Ni-Mo catalyst under conditions similar to those in Example I except the first run was conducted without supercritical solvent.

| | 88-Hr. Run Without Solvent | 154-Hr. Run With n-$C_7$ Solvent |
|---|---|---|
| Oil Conversion, % | 65-85 | 75-90 |
| Yield, % of Feed: | | |
| Gases | 20-30 | 5-10 |
| Liquids Boiling above 310° F. | 50-60 | 70-80 |
| Coke | 0.84 | 0.48 |

This example shows that conventional hydrotreating without supercritical solvent produced about three times as much gas and almost twice as much coke while operating at lower conversion.

EXAMPLE III

The following runs used Paraho shale oil dissolved in four times its weight of solvent. Hydrotreatment at 850° F., 1400 psig, 1.6 LHSV feed rate, 300 GHSV hydrogen, Ni-Mo on alumina catalyst.

| Solvent | $H_2$ Consumption scf/bbl | Heavy Oil Fraction[1] | | | $MCH^2$ in Reclaimed Solvent Wt % |
|---|---|---|---|---|---|
| | | Wt. % of feed | Nitrogen ppm | Sulfur ppm | |
| Toluene | 3200 | 37 | 4,430 | 50 | 7.57 |
| Toluene | 3700 | 32 | 5,030 | 50 | 5.50 |
| Toluene w/5% $MCH^2$ | 2200 | 40 | 6,710 | 30 | 6.24 |
| Toluene w/5% MCH | 2000 | 33 | 9,116 | $NA^3$ | 6.84 |
| Toluene w/5% MCH | 2000 | 39 | 10,770 | NA | 5.27 |
| Toluene | 3200 | 39 | 10,216 | NA | 4.95 |

[1] Fraction boiling above 320° F.
[2] Methylcyclohexane
[3] Not applicable

The data show that in runs with toluene only as the solvent, about 5-7 percent of the solvent is hydrogenated to methylcyclohexane. In runs with mixed solvent very little solvent is hydrogenated and hydrogen consumption is substantially reduced. Conversion to heavy oil fraction and reduction of nitrogen and sulfur were not materially affected. These data indicate that, with close control of process conditions and mixed (aromatic-cyclic) solvent composition, hydrogenation of the solvent can be substantially avoided.

I claim:

1. A process for recovering hydrocarbons from naturally-occurring low organic carbon content carbonaceous material selected from oil shale, tar sand, and mixtures thereof comprising the step of contacting said material under supercritical conditions with an added mixture of structurally analogous hydrocarbon solvents wherein at least one solvent is aromatic, at least one solvent is cycloaliphatic and is structurally analogous to the aromatic solvent, and wherein the cycloaliphatic solvent is present in an amount of 2–10% by weight based on the total solvent weight.

2. The process of claim 1 wherein the cycloaliphatic solvent is present in an amount of 5 to 10% by weight based on the total solvent weight.

3. The process of claims 1 or 2 wherein the aromatic solvent is toluene or benzene and the structurally analogous cycloaliphatic solvent is methylcyclohexane or cyclohexane.

4. The process of claims 1 or 2 further comprising the steps of hydrotreating the material in the presence of the solvent mixture and recovering the resultant hydrotreated product.

5. The process of claim 4 wherein the solvent mixture comprises toluene and methylcyclohexane.

* * * * *